(12) United States Patent
Nehls et al.

(10) Patent No.: US 10,903,637 B2
(45) Date of Patent: Jan. 26, 2021

(54) STRUCTURES FOR SECURING BROADCAST CABLING AND CONNECTORS

(71) Applicant: Optical Cable Corporation, Roanoke, VA (US)

(72) Inventors: Charlie Nehls, Fenton, MO (US); Ian J. Timmins, Seminole, FL (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 16/700,630

(22) Filed: Dec. 2, 2019

(65) Prior Publication Data

US 2020/0106252 A1 Apr. 2, 2020

Related U.S. Application Data

(63) Continuation-in-part of application No. 15/700,944, filed on Sep. 11, 2017, now Pat. No. 10,498,119.

(Continued)

(51) Int. Cl.
*A47B 53/00* (2006.01)
*A47F 3/00* (2006.01)
(Continued)

(52) U.S. Cl.
CPC ............... *H02G 3/16* (2013.01); *A47B 53/00* (2013.01); *A47F 3/002* (2013.01);
(Continued)

(58) Field of Classification Search
CPC .......... H02G 3/16; H02G 3/081; H02G 3/31; H02G 3/14; H02G 3/0456; H02G 3/22; F16L 5/00; F16L 3/223; A47F 2007/0085; A47F 7/005; A47F 3/002; A47B 2097/003; A47B 87/00; A47B 46/00; A47B 53/00; A47B 53/02; A47B 51/00; E05B 65/0003; E05B 65/464; E05B 65/025
(Continued)

(56) References Cited

U.S. PATENT DOCUMENTS 241,123 A * 5/1881 Danner ................ A47B 49/004
                                                312/249.2
850,210 A * 4/1907 Cady .................... A47B 17/036
                                                312/289

(Continued)

*Primary Examiner* — Jennifer E. Novosad
(74) *Attorney, Agent, or Firm* — William G. Needy; The Van Winkle Law Firm

(57) ABSTRACT

A structure for securing broadcast cables and connectors includes a wall mounted enclosure including a front section, a middle section and rear section, the front and middle sections surrounding a first cavity and the middle and rear sections surrounding a second cavity; a panel having a first and second wings joined together at a convex angle and defining a plurality of isolation plate mounts; the panel being selectively interchangeable between first and second configurations, wherein the first configuration is defined by the panel being selectively attached such that the convex angle faces the first cavity and the second configuration is defined by the panel being selectively attached such that the convex angle faces the second cavity; an internal lock system for selectively accessing the second cavity; and the internal lock system being accessible from within the first cavity.

14 Claims, 9 Drawing Sheets

Related U.S. Application Data

(60) Provisional application No. 62/385,490, filed on Sep. 9, 2016.

(51) Int. Cl.
  *E05B 65/00* (2006.01)
  *A47B 97/00* (2006.01)
  *H02G 3/16* (2006.01)
  *H02G 3/10* (2006.01)
  *H02G 3/14* (2006.01)
  *H02G 3/08* (2006.01)

(52) U.S. Cl.
  CPC ......... *E05B 65/0003* (2013.01); *H02G 3/081* (2013.01); *H02G 3/10* (2013.01); *H02G 3/14* (2013.01); *A47B 2097/003* (2013.01)

(58) Field of Classification Search
  USPC ............... 211/26, 4, 8, 2; 248/49, 56, 65; 312/217, 216, 215, 199, 223.1, 223.6, 312/213, 107.5, 219, 220
  See application file for complete search history.

(56) References Cited

U.S. PATENT DOCUMENTS

| | | | | | |
|---|---|---|---|---|---|
| 1,227,799 | A | * | 5/1917 | Kaub | A47B 53/00 312/300 |
| 1,254,132 | A | * | 1/1918 | Garman | A47B 53/00 312/300 |
| 1,440,146 | A | * | 12/1922 | Hawley | E05B 65/467 312/199 |
| 1,779,218 | A | * | 10/1930 | Schmalzgruber | A47B 53/00 312/302 |
| 2,086,472 | A | * | 7/1937 | Clark | A47B 53/00 312/190 |
| 2,213,274 | A | * | 9/1940 | Flamm | F25D 11/02 62/265 |
| 2,286,427 | A | * | 6/1942 | Levensten | B25H 3/02 312/222 |
| 2,311,718 | A | * | 2/1943 | Way | A47B 53/00 312/212 |
| 2,414,752 | A | * | 1/1947 | Mabie | A47B 53/00 108/102 |
| 2,660,506 | A | * | 11/1953 | Stanley | A47B 53/00 312/306 |
| 2,739,024 | A | * | 3/1956 | Jerome | A47B 53/00 312/283 |
| 3,055,723 | A | * | 9/1962 | Hildebrand, Sr. | A47B 53/00 312/200 |
| 3,089,745 | A | * | 5/1963 | Postula | A47B 53/00 312/324 |
| 3,310,905 | A | * | 3/1967 | Davis | A01K 97/06 43/57.1 |
| 4,211,455 | A | * | 7/1980 | Tedrow | B25H 3/02 312/198 |
| 4,303,158 | A | * | 12/1981 | Perkins | B25H 3/02 206/373 |
| 4,343,172 | A | * | 8/1982 | Nordlund | B25H 3/04 72/339 |
| 4,502,742 | A | * | 3/1985 | Neff | A47B 53/00 312/321.5 |
| 4,586,633 | A | * | 5/1986 | Holland | G07F 11/34 221/257 |
| 4,648,737 | A | * | 3/1987 | Lake, Jr. | E05B 73/00 206/821 |
| 4,675,782 | A | * | 6/1987 | Hibbert | H02B 1/40 361/600 |
| 4,892,198 | A | * | 1/1990 | Johnson | A47F 5/005 211/184 |
| 5,267,710 | A | * | 12/1993 | Condon | F16L 3/24 248/56 |
| 5,422,436 | A | * | 6/1995 | Zachrai | H02B 1/305 174/152 G |
| 5,615,850 | A | * | 4/1997 | Cloninger | F16L 3/22 248/68.1 |
| 5,641,079 | A | * | 6/1997 | Schmidt | A47F 5/0823 211/104 |
| 5,769,006 | A | * | 6/1998 | Allaer | E05G 1/00 109/51 |
| 5,820,238 | A | * | 10/1998 | Lambright | A47B 46/00 312/291 |
| 5,945,633 | A | * | 8/1999 | Ott | G02B 6/4452 174/59 |
| 5,971,329 | A | * | 10/1999 | Hickey | F16L 3/227 248/316.7 |
| 6,242,697 | B1 | * | 6/2001 | Gerken | H02G 3/085 16/2.1 |
| 6,269,961 | B1 | * | 8/2001 | Porcelli | A47F 5/112 211/70.7 |
| 6,305,388 | B1 | * | 10/2001 | Zeller | A45D 44/02 132/287 |
| 6,591,952 | B1 | * | 7/2003 | Randall | A45D 44/02 191/12.4 |
| 6,737,576 | B1 | * | 5/2004 | Dinh | H02G 3/088 174/480 |
| 6,806,425 | B1 | * | 10/2004 | O'Neill | H02G 3/14 174/66 |
| 6,866,541 | B2 | * | 3/2005 | Barker | G02B 6/4452 439/540.1 |
| 6,884,942 | B2 | * | 4/2005 | McGrath | H04Q 1/064 174/135 |
| 6,959,821 | B2 | * | 11/2005 | Huang | G09F 9/35 211/13.1 |
| 7,098,406 | B1 | * | 8/2006 | Hammonds | B65H 75/06 174/135 |
| 7,249,681 | B2 | * | 7/2007 | Scicluna | G11B 33/0472 206/307 |
| 7,479,598 | B1 | * | 1/2009 | Shotey | H02G 3/14 174/135 |
| 7,520,474 | B1 | * | 4/2009 | Condon | E03C 1/021 248/56 |
| 7,637,773 | B2 | * | 12/2009 | Shifris | H01R 9/2416 439/540.1 |
| 7,726,750 | B2 | * | 6/2010 | Johnson | E05B 63/244 312/217 |
| 7,866,909 | B2 | * | 1/2011 | Denmark | F16B 21/09 24/115 G |
| 7,905,454 | B2 | * | 3/2011 | Sanatgar | F28F 9/013 248/300 |
| 8,038,015 | B2 | * | 10/2011 | Laursen | H04Q 1/09 211/26 |
| 8,054,649 | B2 | * | 11/2011 | Peng | H05K 7/1487 248/298.1 |
| 8,119,915 | B2 | * | 2/2012 | Regester | H04Q 1/06 174/100 |
| 8,246,382 | B1 | * | 8/2012 | Ku | H05K 7/186 439/540.1 |
| 8,360,373 | B2 | * | 1/2013 | Johnson | A47F 7/024 211/26 |
| 8,456,819 | B1 | * | 6/2013 | Smith | A47B 96/00 312/223.1 |
| 8,522,969 | B2 | * | 9/2013 | Mason | B25H 3/02 206/234 |
| 8,544,623 | B1 | * | 10/2013 | Murphy | H02G 11/02 191/12.4 |
| 8,695,929 | B2 | * | 4/2014 | Cox | H02G 3/0493 174/100 |
| 8,752,848 | B2 | * | 6/2014 | Petrick | H01R 13/465 280/47.35 |
| 8,834,199 | B2 | * | 9/2014 | Foung | H01R 13/518 439/540.1 |
| 8,931,742 | B2 | * | 1/2015 | Gong | H05K 7/1491 248/49 |
| 9,192,231 | B1 | * | 11/2015 | Steffen | A47B 81/005 |
| 9,247,319 | B2 | * | 1/2016 | Cole | H04Q 1/13 |
| 9,383,179 | B1 | * | 7/2016 | Spilotro | F42B 39/28 |
| 9,532,638 | B2 | * | 1/2017 | Davis | A45D 44/02 |

(56) References Cited

U.S. PATENT DOCUMENTS

| | | | | |
|---|---|---|---|---|
| 9,632,271 | B2* | 4/2017 | Montgelas | G02B 6/4452 |
| 9,660,397 | B2* | 5/2017 | Islam | H01R 13/518 |
| 9,914,209 | B2* | 3/2018 | Grela | A47B 31/00 |
| 9,924,611 | B2* | 3/2018 | Tonthat | H05K 7/1489 |
| 9,938,012 | B1* | 4/2018 | Kollias | B64D 11/00 |
| 9,943,177 | B1* | 4/2018 | Miloserny | A47F 3/06 |
| 9,952,397 | B2* | 4/2018 | Hanson | G02B 6/445 |
| 10,135,268 | B1* | 11/2018 | Gokcebay | H04B 1/3883 |
| 2002/0181896 | A1* | 12/2002 | McClellan | G02B 6/4452 |
| | | | | 385/88 |
| 2006/0032990 | A1* | 2/2006 | Cask | H02G 3/0456 |
| | | | | 248/56 |
| 2006/0060114 | A1* | 3/2006 | Walker | E05G 1/00 |
| | | | | 109/67 |
| 2006/0118321 | A1* | 6/2006 | Herring | H02G 3/0431 |
| | | | | 174/101 |
| 2007/0196071 | A1* | 8/2007 | Laursen | G02B 6/3897 |
| | | | | 385/135 |
| 2009/0067800 | A1* | 3/2009 | Vazquez | A47B 46/00 |
| | | | | 385/135 |
| 2009/0163043 | A1* | 6/2009 | Demers | H01R 13/514 |
| | | | | 439/43 |
| 2009/0321371 | A1* | 12/2009 | Rathbone | H05K 7/1491 |
| | | | | 211/26.2 |
| 2012/0193309 | A1* | 8/2012 | Fleischer | H05K 5/0204 |
| | | | | 211/26.2 |
| 2012/0288249 | A1* | 11/2012 | Ruiz | H04Q 1/02 |
| | | | | 385/135 |
| 2013/0134116 | A1* | 5/2013 | Taylor | H04Q 1/06 |
| | | | | 211/26.2 |
| 2014/0206273 | A1* | 7/2014 | Larsen | H04Q 1/09 |
| | | | | 454/184 |
| 2014/0366390 | A1* | 12/2014 | Lampley | A45D 44/02 |
| | | | | 30/537 |
| 2017/0187205 | A1* | 6/2017 | Li | A47B 81/00 |
| 2018/0076604 | A1* | 3/2018 | Nehls | G02B 6/4471 |
| 2019/0281978 | A1* | 9/2019 | Bowers | A47B 53/02 |
| 2020/0036175 | A1* | 1/2020 | Chen | H02G 3/083 |
| 2020/0106252 | A1* | 4/2020 | Nehls | H02G 3/10 |

* cited by examiner

US 10,903,637 B2

STRUCTURES FOR SECURING BROADCAST CABLING AND CONNECTORS

RELATED APPLICATION

This application is a Continuation-In-Part Application of U.S. Non-Provisional patent application Ser. No. 15/700,944 filed on Sep. 11, 2017, which claims priority to and incorporates entirely by reference U.S. Provisional Patent Application Ser. No. 62/385,490, filed on Sep. 9, 2016.

FIELD OF THE INVENTION

This invention relates to broadcast connectivity and, more particularly, a system of structures for securing broadcast cabling and connectors.

BACKGROUND OF THE INVENTION

The broadcast market utilizes unique cables and connectors. The specific types of cable and connectors chosen for a particular network is related to the network's topology, protocol, and size. This invention details the development of multiple panels, enclosures, and brackets that cater to the broadcast market.

SUMMARY OF THE INVENTION

In accordance with one form of this invention there is provided a structure for securing broadcast cables and connectors, the structure including a wall mounted enclosure including a front section, a middle section and rear section, the front and middle sections surrounding a first cavity and the middle and rear sections surrounding a second cavity, and wherein a partition separates the first and second cavities; a panel having a first wing and a second wing, the panel defining a plurality of isolation plate mounts on the first wing, the panel being sized and configured for engaged abutment with the partition, and wherein the first and the second wings join together to form a convex angle; the panel being selectively interchangeable between first and second configurations, wherein the first configuration is defined by the panel being selectively attached to the partition such that the convex angle formed by the first and the second wings faces the first cavity and the second configuration is defined by the panel being selectively attached to the partition such that the convex angle formed by the first and the second wings faces the second cavity; an internal lock system for selectively accessing the second cavity, wherein the internal lock system is structured and disposed to lock the middle section to the rear section; the internal lock system being accessible from within the first cavity; and at least one cable management bracket in the second cavity of the wall mounted enclosure.

In accordance with another form of this invention, there is provided a structure for securing broadcast cables and connectors, the structure including a wall mounted enclosure including a front section, a middle section and rear section, the front and middle sections surrounding a first cavity and the middle and rear sections surrounding a second cavity, and wherein a partition separates the first and second cavities; a panel having a first wing and a second wing, the panel defining a plurality of isolation plate mounts on the first wing, the panel being sized and configured for engaged abutment with the partition, and wherein the first and the second wings join together to form a convex angle; an internal lock system for selectively accessing the second cavity, wherein the internal lock system is structured and disposed to lock the middle section to the rear section; the internal lock system being accessible from within the first cavity; and at least one cable management bracket in the second cavity of the wall mounted enclosure.

In accordance with another form of this invention, there is provided a structure for securing broadcast cables and connectors, the structure including a wall mounted enclosure including a front section, a middle section and rear section, the front and middle sections surrounding a first cavity and the middle and rear sections surrounding a second cavity, and wherein a partition separates the first and second cavities; a panel having a first wing and a second wing, the panel defining a plurality of isolation plate mounts on the first wing, the panel being sized and configured for engaged abutment with the partition, and wherein the first and the second wings join together to form a convex angle; an internal lock system for selectively accessing the second cavity, wherein the internal lock system is structured and disposed to lock the middle section to the rear section; and at least one cable management bracket in the second cavity of the wall mounted enclosure.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Figure 4:
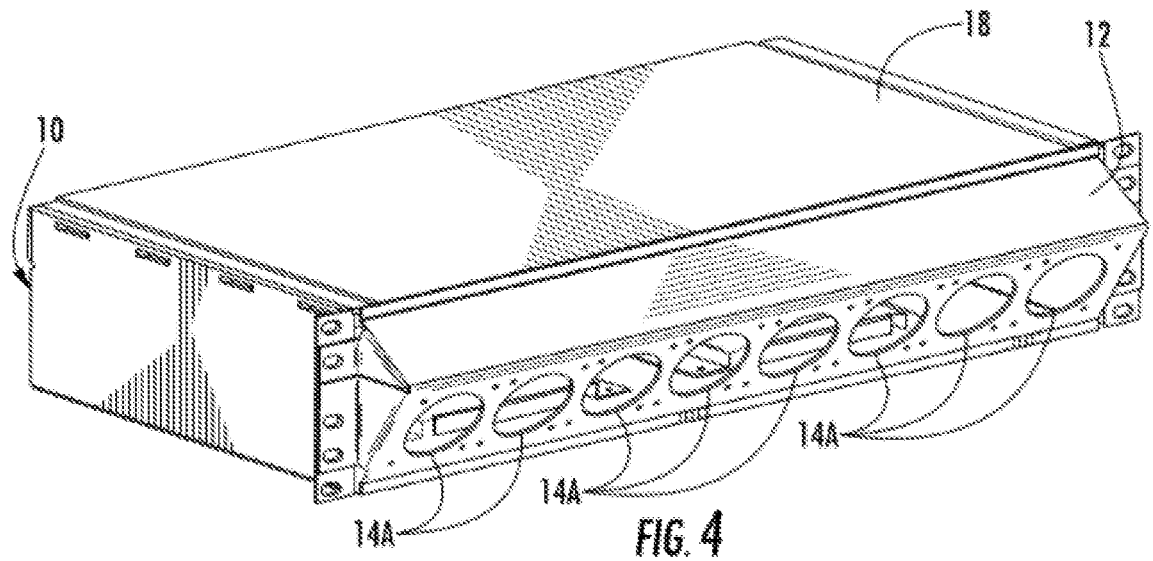
FIG. 4 is a perspective view of a rack mount enclosure with angle panel in front, wherein the enclosure attaches directly to the rack and the panel is attached to the rack on top of the enclosure.
Figure 5:
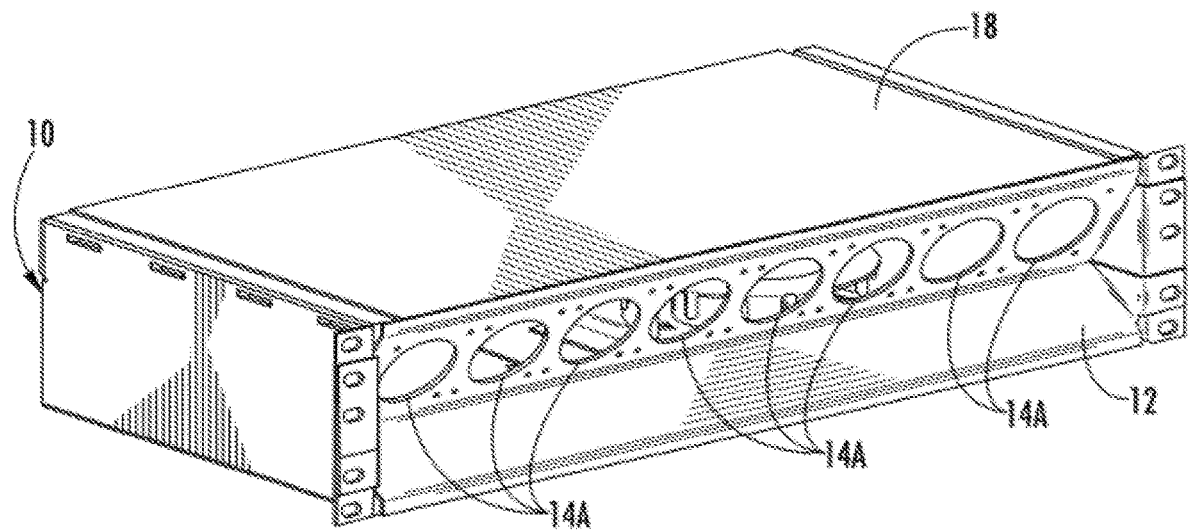
FIG. 5 is a perspective view of a closed rack mount enclosure with angle panel in alternate orientation.

Referring to the several views of the drawings, the system of structures for securing broadcast cabling and connectors of the present invention is shown and described herein and is generally indicated as 10, a fully assembled rack mount enclosure 16 with attachment of a rack mounted panel 12 in alternate orientation, as shown in FIG. 4-5.

Figure 1:
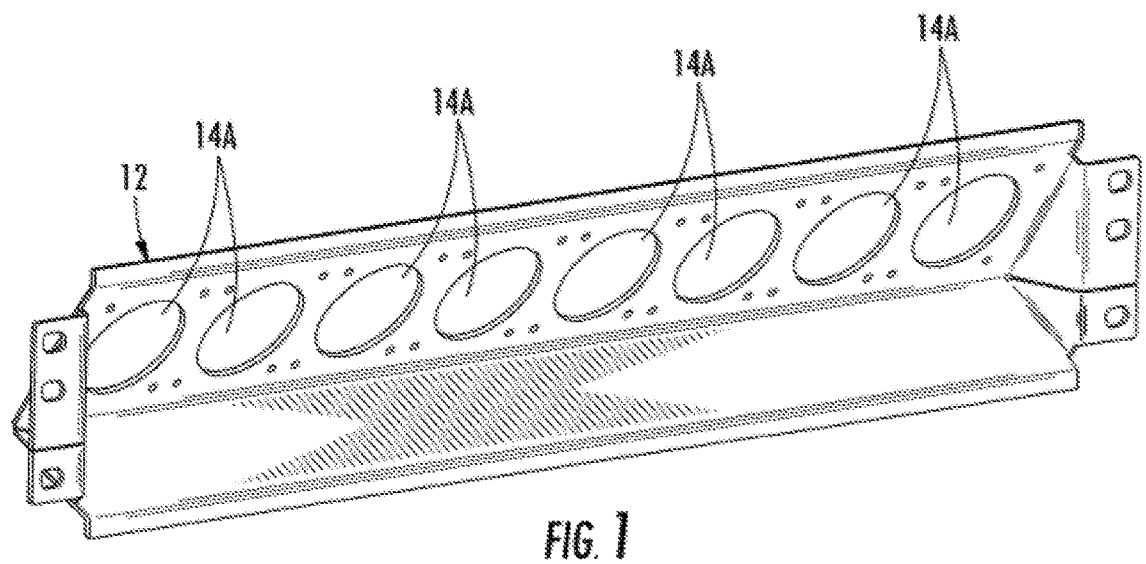
FIG. 1 is a perspective view of a rack mounted panel with eight isolation plate mounts and being made from one metal piece with no welds or other fastening mechanisms.
Figure 2:
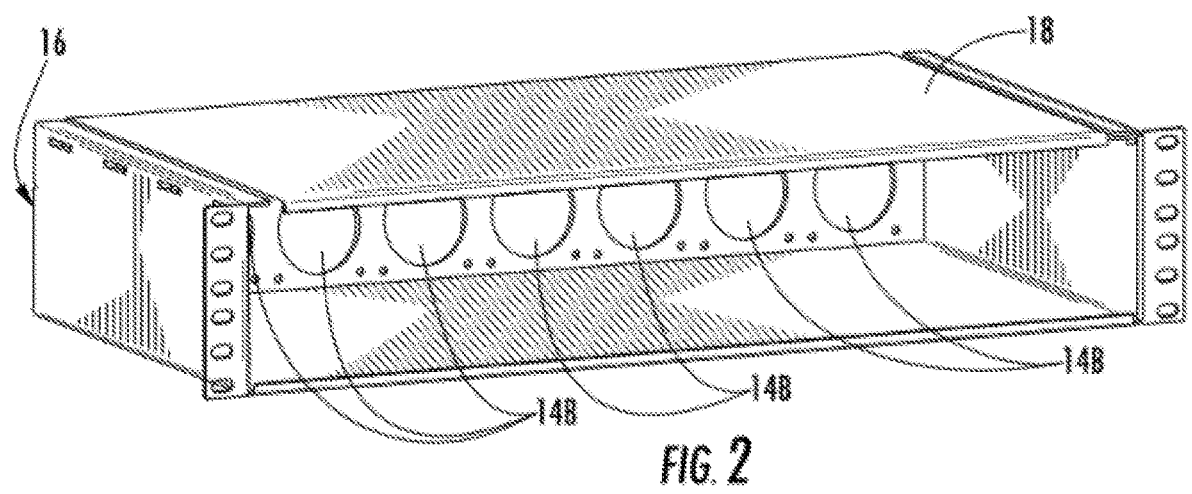
FIG. 2 is a perspective view of a $2u$ rack mounted enclosure with removable cover and eight universal isolation plate mounts on the rear and an open front that can accommodate an angled adapter plate.
Figure 3:
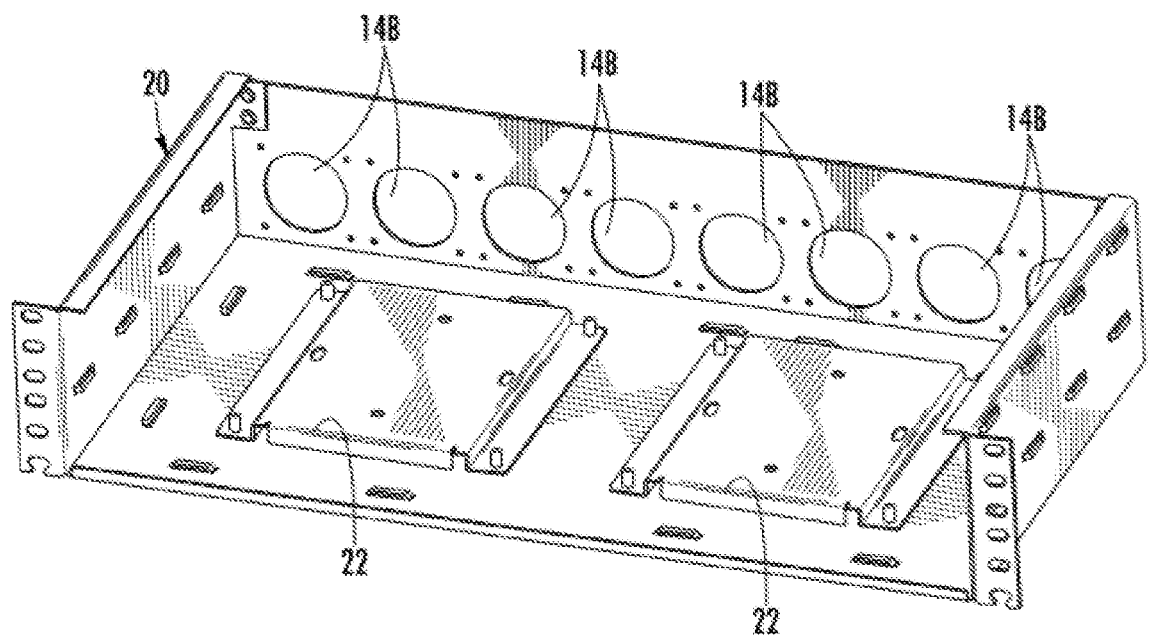
FIG. 3 is a perspective view of an open rack mount enclosure with cable management brackets.

Referring to FIGS. 1-3 and initially to FIG. 1, a rack mounted panel 12 has two wings forming a convex angle and includes eight universal isolation plate mounts 14A on one wing. In a preferred, non-limiting embodiment, the rack mounted panel 12 is made from one metal piece with no welds or other fastening mechanisms. Other suitable materials may be used to form the rack mounted panel 12. Referring now to FIG. 2, the 2u rack mounted enclosure 16 includes a removable cover 18 and eight universal isolation plate mounts 14B on the rear, as well as an open front that can accommodate the rack mounted panel 12. Referring specifically to FIG. 3, an opened 2u rack mount enclosure base 20 is shown without the removable cover 18 or the attachable rack mount panel 12. On the inner bottom surface, there is at least one cable management brackets 22 for managing cable.

Referring specifically to FIG. 4, a fully assembled 2u rack mount enclosure 10 including the rack mounted panel 12 is shown, wherein the rack mounted panel 12 is attached to the front side of the 2u rack mount enclosure 16. The rack mounted panel 12 is attached in an orientation that the convex angle of two wings of the rack mounted panel 12 is facing inside.

Referring specifically to FIG. 5, a fully assembled 2u rack mount enclosure 10 may include the rack mounted panel 12 in an alternate orientation that the convex angle of two wings of the rack mounted panel 12 is facing outside. Importantly, orientations of the rack mounted panel 12 can be changed without removing the 2u rack mount enclosure 16.

Figure 6:
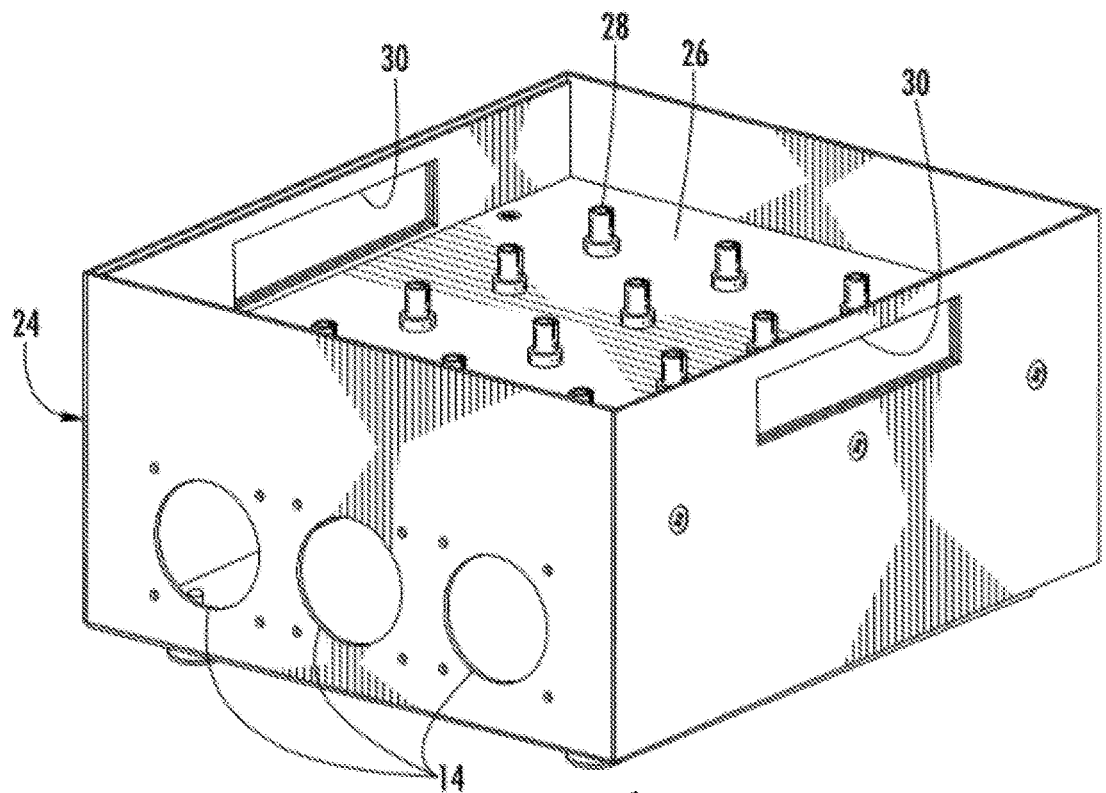
FIG. 6 is a perspective view of a rugged throw-down box with universal isolation plate mounts and including a recessed lid to protect fiber connectors and handle cutouts cut through both cover and base of enclosure.
Figure 7:
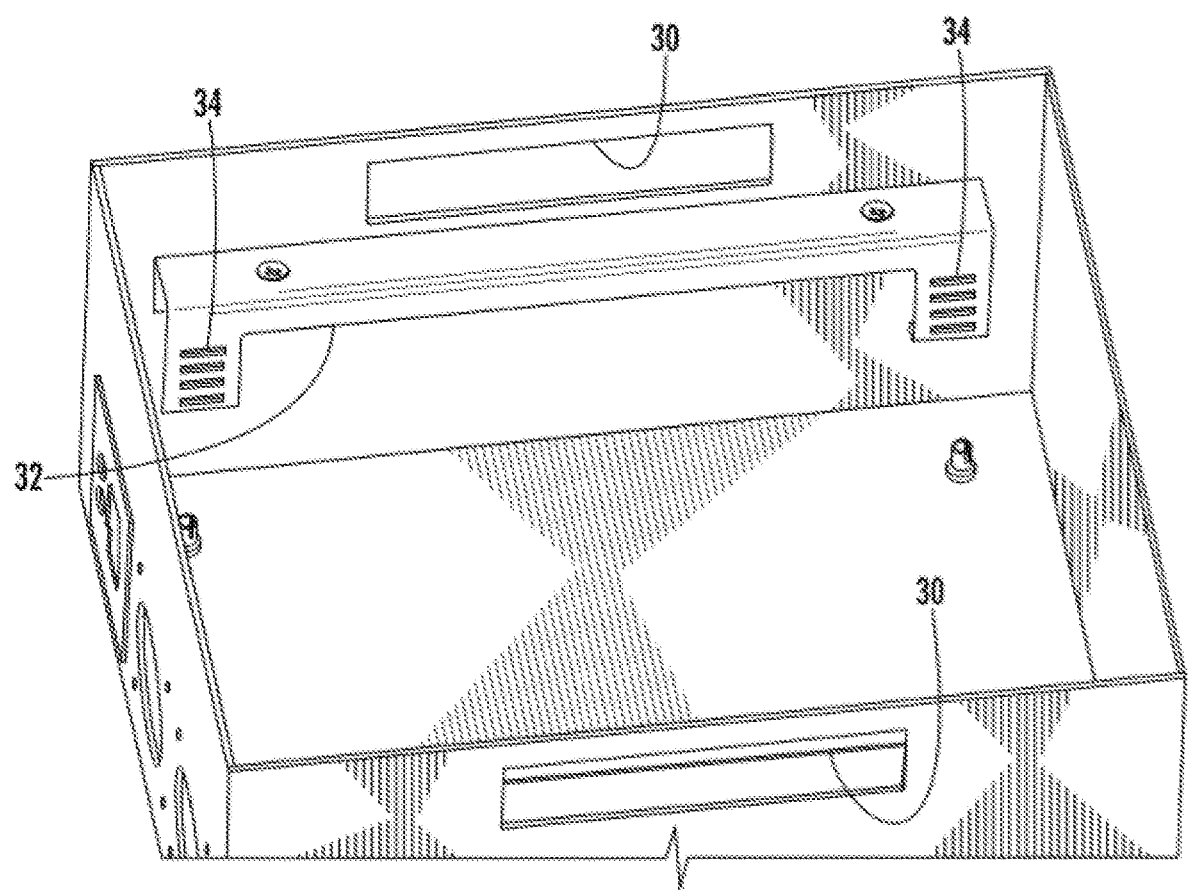
FIG. 7 is a perspective view of an interior bracket that is welded onto side of chassis. It is the base on to which the cover fastens. It incorporates a novel fiber management system on the edges of the bracket.

Referring specifically to FIG. 6, a rugged throw-down box 24 includes a number of universal isolation plate mounts 14 and a recessed lid 26 for protecting fiber connectors 28. Two handle cutouts 30 are cut through two side surfaces of the rugged throw-down box 24. Referring specifically to FIG. 7, an interior bracket 32 is welded onto the inner side surface of the rugged throw-down box 24, below the handle cutout 30. It is the base on to which a cover fastens, thereby forming the recessed lid 26. Moreover, the interior bracket 32 includes a slotted fiber management system 34 along its opposing edges.

It is preferred that the angle between two wings of the rack mounted panel 12 is between 30° and 90°. As shown in FIG. 4-5, the universal isolation plate mounts 14A may be on the top section (as shown in FIG. 5) or the bottom section (as shown in FIG. 4) of the front side of the 2u rack mounted enclosure 16, as is required by the environment.

Referring now to FIGS. 8-13, another embodiment of the system of structures for securing broadcast cabling and connectors is shown and includes a wall mount enclosure 116 for use in controlled environment broadcast locations, such as studios, sports locker rooms, corporate facilities, stadium broadcast booths, schools and/or houses of worship in a single enclosure requiring no additional equipment.

Figure 8:
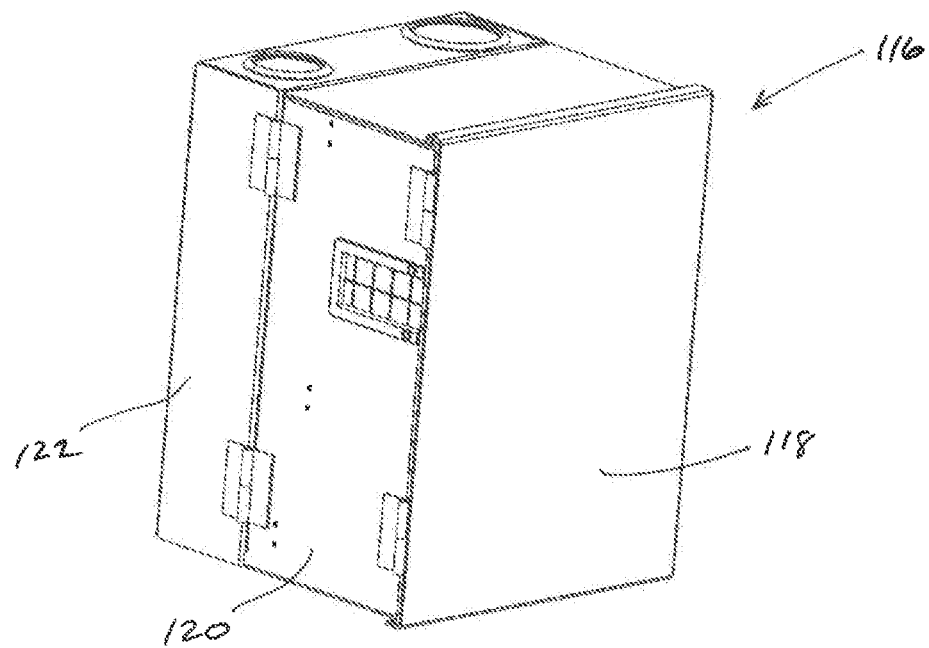
FIG. 8 is a perspective view of a wall mount enclosure in the fully closed configuration.
Figure 9:
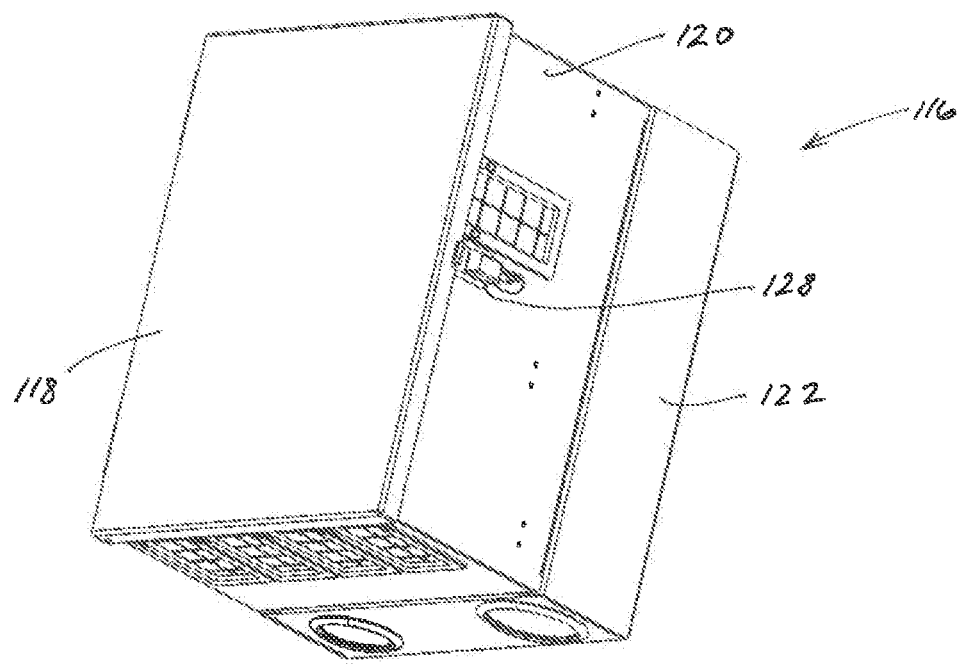
FIG. 9 is a perspective view of a wall mount enclosure in the fully closed configuration.
Figure 10:
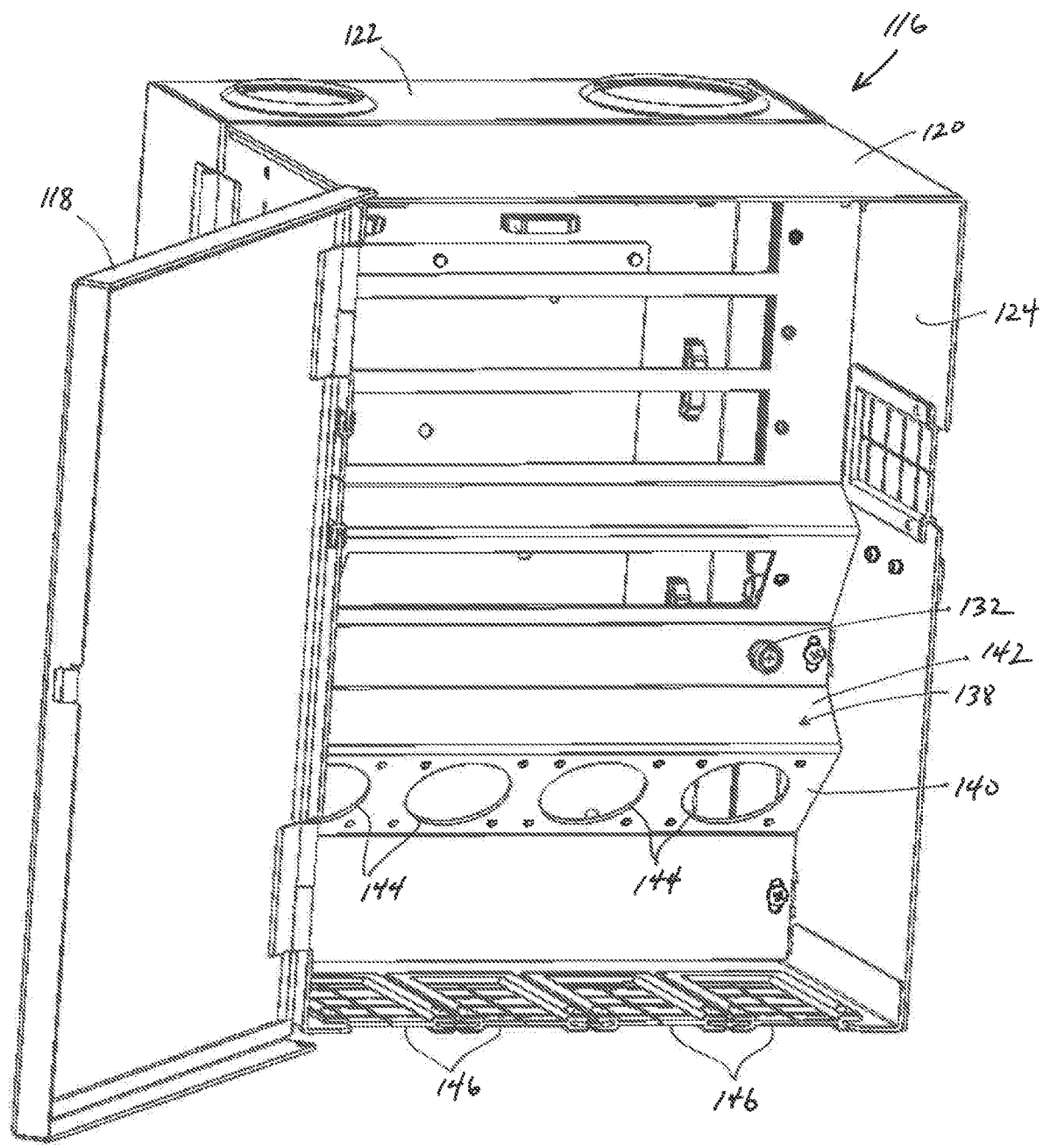
FIG. 10 is a perspective view of a wall mount enclosure with the front section and middle section in the opened configuration.
Figure 11:
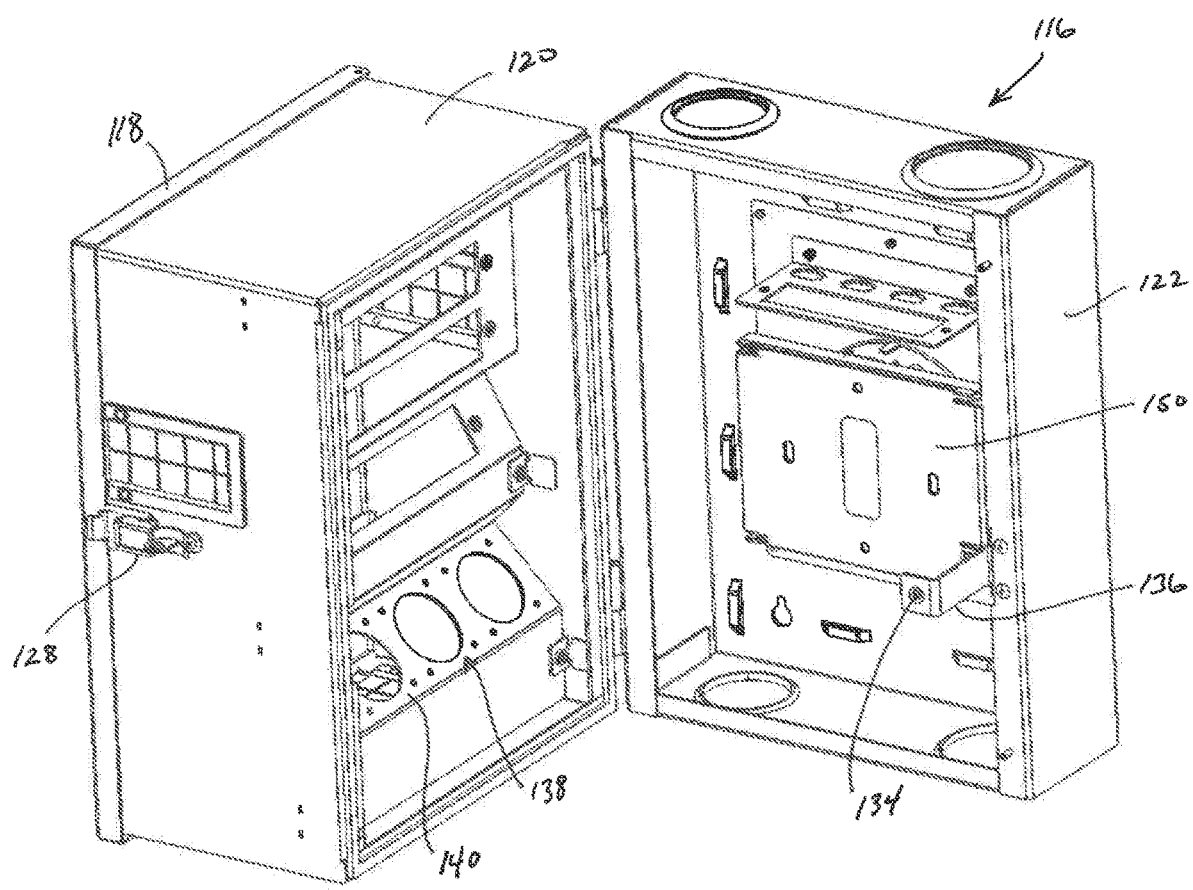
FIG. 11 is a perspective view of a wall mount enclosure with the middle section and rear section in the opened configuration.
Figure 12:
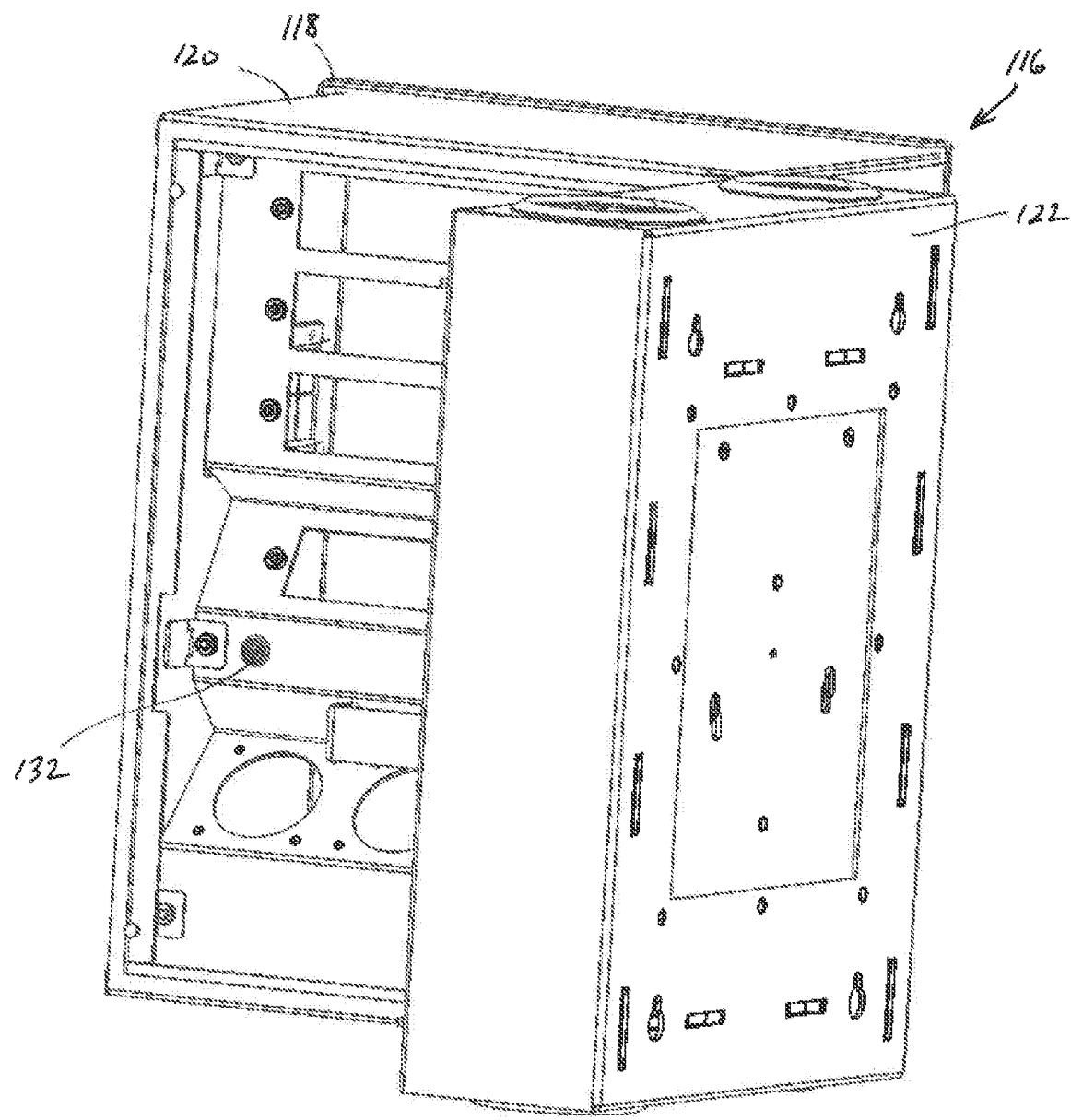
FIG. 12 is a perspective view of a wall mount enclosure with the middle section and rear section in the opened configuration.
Figure 13:
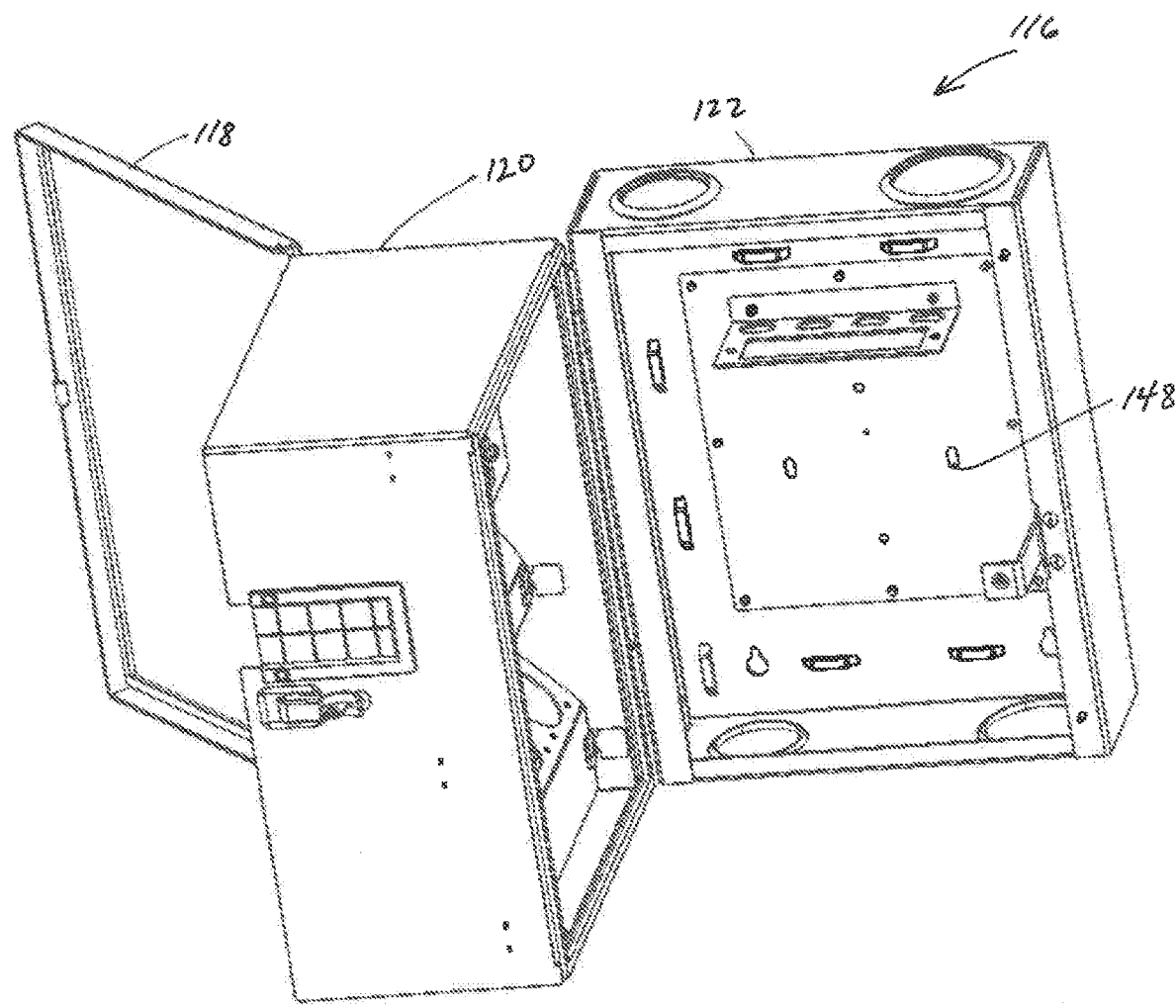
FIG. 13 is a perspective view of a wall mount enclosure in the fully opened configuration.

The wall mount enclosure 116 includes three sections (front section 118, middle section 120 and rear section 122) for ease of installation. In one embodiment, the front section 118 is hingedly securable to the middle section 120 and the middle section 120 is hingedly securable to the rear section 122. When in the closed configuration, as shown in FIGS. 8 and 9, the front section 118 and middle section 120 form a first cavity 124 and the middle section 120 and rear section 122 form a second cavity 126. A lock system 128 is provided on the outer surface of the wall mount enclosure 116 for selectively locking the front section 118 and middle section 120 in the closed configuration. The lock system 128 may be a latch lock that is used in connection with a padlock (not shown).

An internal lock system 130 is provided for selectively locking the middle section 120 with the rear section 122 in the closed configuration such that access to the second cavity 126 is tamper resistant when the front section 118 is secured to the middle section 120. The internal locking system 130 includes an internal locking screw 132 on the middle section 120 that is sized and configured for engaging an opening 134 formed by a clasp member 136 in the second cavity 126, which is secured to the rear section 122, when the middle section 120 is closed against the rear section 122, and wherein the internal locking screw 132 is accessible from within the first cavity 124.

A panel 138 having a first wing 140 and a second wing 142 and defining a plurality of isolation plate mounts 144 is provided to reduce heavy cable load on connectors. It is preferred that the angle between two wings 140 and 142 of the panel 138 is between 30° and 90°. The wall mount enclosure 116 provides adaptability to multiple connector types, including but not limited to SMPTE, BNC, RJ45, SC, ST, LC, and FC. The rear section 122 incorporates conduit openings and the center section 120 includes rubber grommets 146 for cable entry/exit. In a preferred embodiment, there is at least one cable management bracket 148 for managing cable on the rear section 122 using a splice cassette 150 or other cable management apparatus.

While the present invention has been shown and described in accordance with several preferred and practical embodiments, it is recognized that departures from the instant disclosure are contemplated within the spirit and scope of the present invention.

What is claimed is:

1. A structure for securing broadcast cables and connectors, the structure comprising:
    a wall mounted enclosure including a front section, a middle section and rear section, the front and middle sections surrounding a first cavity and the middle and rear sections surrounding a second cavity, and wherein a partition separates the first and second cavities;
    a panel having a first wing and a second wing, the panel defining a plurality of isolation plate mounts on the first wing, the panel being sized and configured for engaged abutment with the partition, and wherein the first and the second wings join together to form a convex angle;
    the panel being selectively interchangeable between first and second configurations, wherein the first configuration is defined by the panel being selectively attached to the partition such that the convex angle formed by the first and the second wings faces the first cavity and the second configuration is defined by the panel being selectively attached to the partition such that the convex angle formed by the first and the second wings faces the second cavity;

an internal lock system for selectively accessing the second cavity, wherein the internal lock system is structured and disposed to lock the middle section to the rear section;

the internal lock system being accessible from within the first cavity; and at least one cable management bracket in the second cavity of the wall mounted enclosure.

2. The structure for securing broadcast cables and connectors as recited in claim 1 wherein the first and the second wings of the panel form a convex angle between 30° and 90°.

3. The structure for securing broadcast cables and connectors as recited in claim 1 wherein the panel is formed from a single piece of material.

4. The structure for securing broadcast cables and connectors as recited in claim 1 further comprising an external lock system for selectively accessing the first cavity, wherein the external lock system is structured and disposed to lock the front section to the middle section.

5. The structure for securing broadcast cables and connectors as recited in claim 1 wherein the internal locking system comprises an internal locking screw on the middle section that is sized and configured for engaging an opening formed by a clasp member on the rear section when the middle section is closed against the rear section, the internal locking screw being accessible from within the first cavity.

6. A structure for securing broadcast cables and connectors, the structure comprising:

a wall mounted enclosure including a front section, a middle section and rear section, the front and middle sections surrounding a first cavity and the middle and rear sections surrounding a second cavity, and wherein a partition separates the first and second cavities;

a panel having a first wing and a second wing, the panel defining a plurality of isolation plate mounts on the first wing, the panel being sized and configured for engaged abutment with the partition, and wherein the first and the second wings join together to form a convex angle;

an internal lock system for selectively accessing the second cavity, wherein the internal lock system is structured and disposed to lock the middle section to the rear section, the internal locking system comprising an internal locking screw on the middle section that is sized and configured for engaging an opening formed by a clasp member on the rear section when the middle section is closed against the rear section, the internal locking screw being accessible from within the first cavity;

the internal lock system being accessible from within the first cavity; and at least one cable management bracket in the second cavity of the wall mounted enclosure.

7. The structure for securing broadcast cables and connectors as recited in claim 6 wherein the first and the second wings of the panel form a convex angle between 30° and 90°.

8. The structure for securing broadcast cables and connectors as recited in claim 6 wherein the panel is formed from a single piece of material.

9. The structure for securing broadcast cables and connectors as recited in claim 6 further comprising an external lock system for selectively accessing the first cavity, wherein the external lock system is structured and disposed to lock the front section to the middle section.

10. A structure for securing broadcast cables and connectors, the structure comprising:

a wall mounted enclosure including a front section, a middle section and rear section, the front and middle sections surrounding a first cavity and the middle and rear sections surrounding a second cavity, and wherein a partition separates the first and second cavities;

a panel having a first wing and a second wing, the panel defining a plurality of isolation plate mounts on the first wing, the panel being sized and configured for engaged abutment with the partition, and wherein the first and the second wings join together to form a convex angle;

an internal lock system for selectively accessing the second cavity, wherein the internal lock system is structured and disposed to lock the middle section to the rear section, the internal locking system comprising an internal locking screw on the middle section that is sized and configured for engaging an opening formed by a clasp member on the rear section when the middle section is closed against the rear section, the internal locking screw being accessible from within the first cavity; and at least one cable management bracket in the second cavity of the wall mounted enclosure.

11. The structure for securing broadcast cables and connectors as recited in claim 10 wherein the internal lock system is accessible from within the first cavity.

12. The structure for securing broadcast cables and connectors as recited in claim 10 wherein the first and the second wings of the panel form a convex angle between 30° and 90°.

13. The structure for securing broadcast cables and connectors as recited in claim 10 wherein the panel is formed from a single piece of material.

14. The structure for securing broadcast cables and connectors as recited in claim 10 further comprising an external lock system for selectively accessing the first cavity, wherein the external lock system is structured and disposed to lock the front section to the middle section.

* * * * *